United States Patent [19]

Martinez

[11] 4,041,634
[45] Aug. 16, 1977

[54] RELEASE OF FISHING HOOK

[76] Inventor: Anastacio Martinez, 2104 N. 39th St., Milwaukee, Wis. 53208

[21] Appl. No.: 642,477

[22] Filed: Dec. 19, 1975

[51] Int. Cl.² .............................................. A01K 97/00
[52] U.S. Cl. ...................................................... 43/17.2
[58] Field of Search .................. 43/17.2, 44.96, 44.97, 43/44.98, 42.49, 44.83, 44.85, 3, 4

[56] References Cited

U.S. PATENT DOCUMENTS

| 2,184,589 | 12/1939 | Griffith | 43/17.2 |
| 2,453,245 | 11/1948 | McDonald, Jr. | 43/17.2 |
| 2,494,012 | 1/1950 | Stricker | 43/17.2 |
| 2,678,778 | 5/1954 | Gibson | 43/3 |
| 3,102,313 | 9/1963 | Arneson | 43/44.83 |

Primary Examiner—Russell R. Kinsey
Assistant Examiner—Peter K. Skiff
Attorney, Agent, or Firm—Andrus, Sceales, Starke & Sawall

[57] ABSTRACT

To release a fishing hook which is snagged on an underwater log or the like, a heavy weight is provided and which is attached to one end of a stringer line such as by a swivel joint. The other end of the stringer line, which need only be several feet in length, is secured, such as through a swivel joint, to means for mounting the stringer line to the fishing line. When the fishing hook is snagged on a submerged log or the like, the fishing line is taken out from the reel, the reel locked, the stringer line is secured to the fishing line, the weight manually twirled and then hurled through the air beyond the snagged hook. Slack is removed from the fishing line and the latter is then yanked toward the fisherman. The fishing line between the hook and weight will exert a force in the opposite direction to release the hook.

3 Claims, 5 Drawing Figures

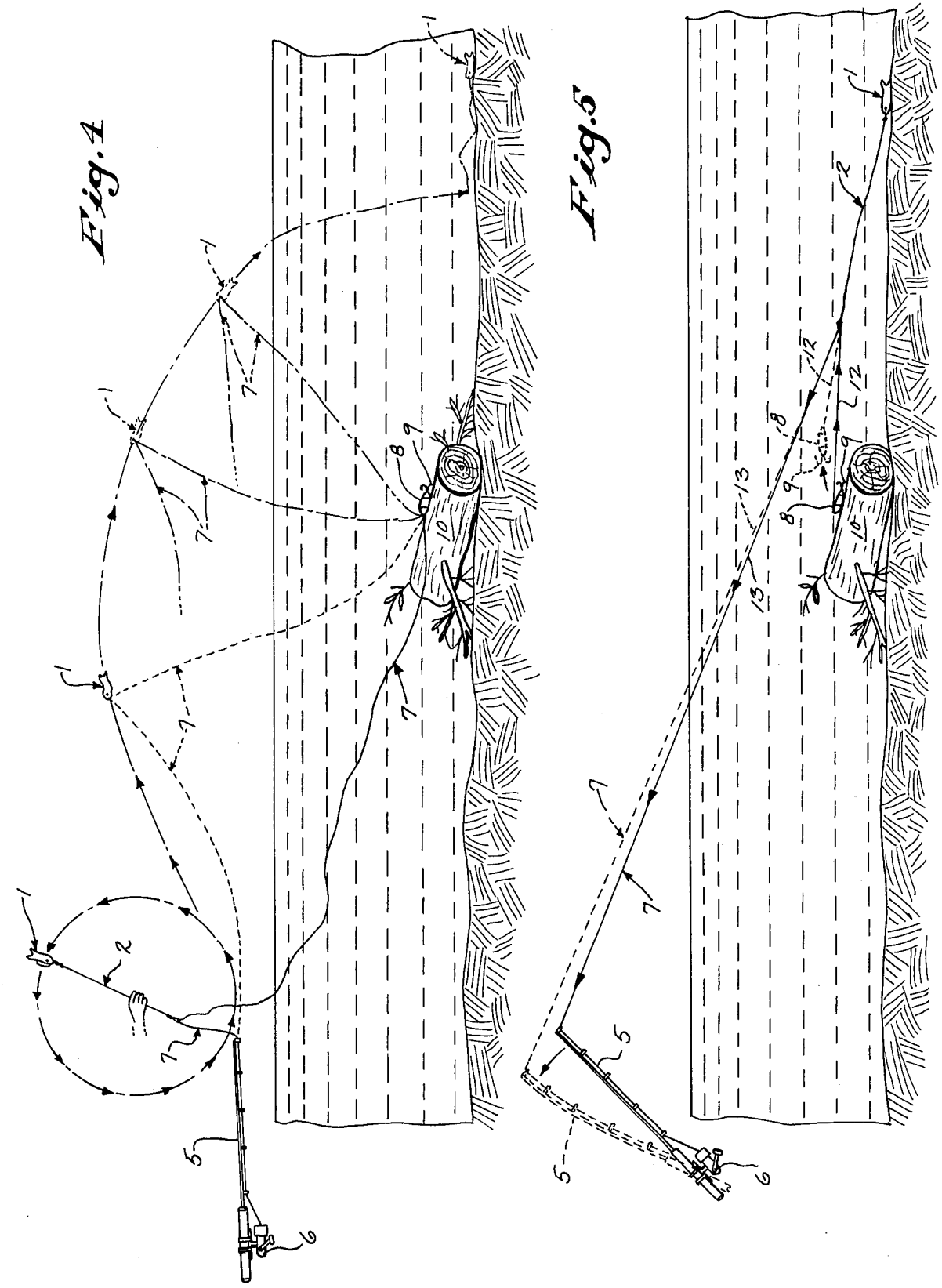

RELEASE OF FISHING HOOK

PRIOR ART OF INTEREST

U.S. Pat. No. 1,044,792, Levy, 11-19-12;
U.S. Pat. No. 2,074,057, Kempke, 3-16-37;
U.S. Pat. No. 2,097,536, Shirk, 11-2-37;
U.S. Pat. No. 2,184,589, Griffith, 12-26-39;
U.S. Pat. No. 2,453,245, McDonald, 11-9-48.

BACKGROUND OF THE INVENTION

This invention relates to the releasing of a fishing hook when it is caught on an underwater obstruction, such as a log or the like.

Heretofore, when a hook has been snagged on an obstruction, it has been necessary for the fisherman to row his boat to the opposite side of the obstruction in order to pull the hook backward to release it. An onshore fisherman had an especially difficult problem in that he would either have to find a boat or he would have to swim out beyond the obstruction.

As shown in the above-indentified patents, various attempts have been made to solve the release problem so that the fisherman could stay in place. Such attempts have utilized a weight which engages the hook to pull it off the obstruction, or the use of the force of the current of a stream to assist in removal.

SUMMARY OF THE INVENTION

The present invention is based on a new concept of fishing hook release and has been found to be very effective.

In accordance with the invention, a heavy weight is provided and which is attached to one end of a stringer line such as by a swivel joint. The other end of the stringer line, which need only be several feet in length, is secured, such as through a swivel joint, to means for mounting the stringer line to the fishing line. When the fishing hook is snagged on a submerged log or the like, the fishing line is taken out from the reel, the reel locked, the stringer line is secured to the fishing line, the weight manually twirled and then hurled through the air beyond the snagged hook. Slack is removed from the fishing line and the latter is then yanked toward the fisherman. The fishing line between the hook and weight will exert a force in the opposite direction to release the hook.

BRIEF DESCRIPTION OF THE DRAWINGS

The accompanying drawings illustrate the best mode presently contemplated by the inventor for carrying out the invention.

In the drawings:

FIG. 4 is a schematic showing of the twirling and hurling of the weight beyond the log, and also showing the final position of the weight; and FIG. 5 is a showing of the releasing of the hook from the log.

DESCRIPTION OF THE PREFERRED EMBODIMENT

Figure 1:
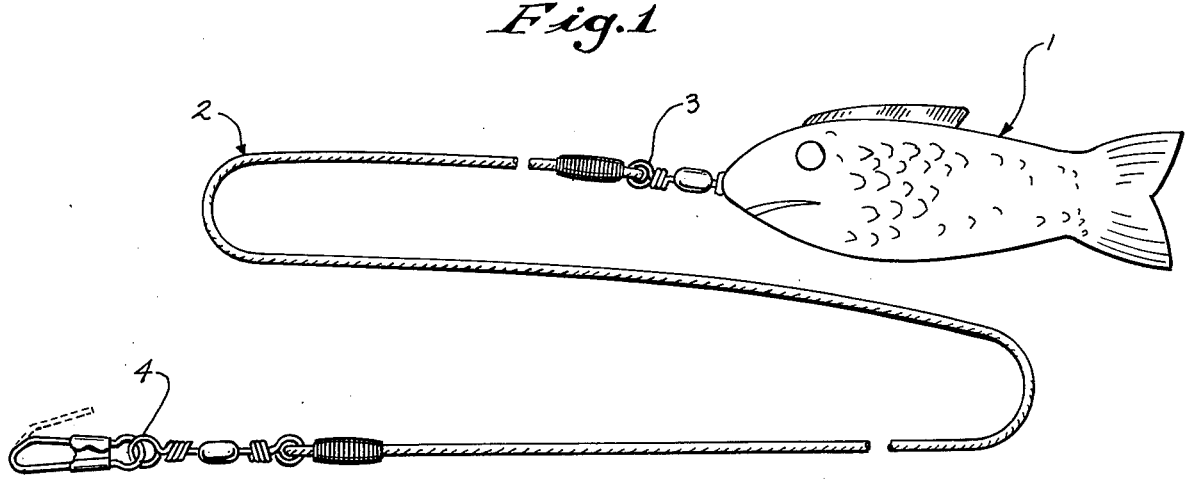
FIG. 1 is a side elevation of a device constructed in accordance with the invention for releasing a snagged fishing hook.

As shown in FIG. 1 of the drawings, the hook retriver device comprises a heavy imperforate weight 1 of lead or other suitable material and which may take the ornamental form of a fish or the like if desired. Weight 1 is attached to one end of an elongated flexible stringer 2 as by a swivel connector 3 which permits the weight to turn on the stringer axis at the point of connection. Stringer 2 is constructed of any suitable line material of adequate tensil strength to withstand substantial axial forces without breaking. These forces, as will be seen, are several times greater than the gravitational weight of weight 1. A second connector 4, which may also be of the swivel type, is attached to the other end of stringer 2, remote from weight 1, and is constructed to be attached to a fishing line so that the line freely extends therethrough.

Operation of the device will now be described in detail.

Figure 2:
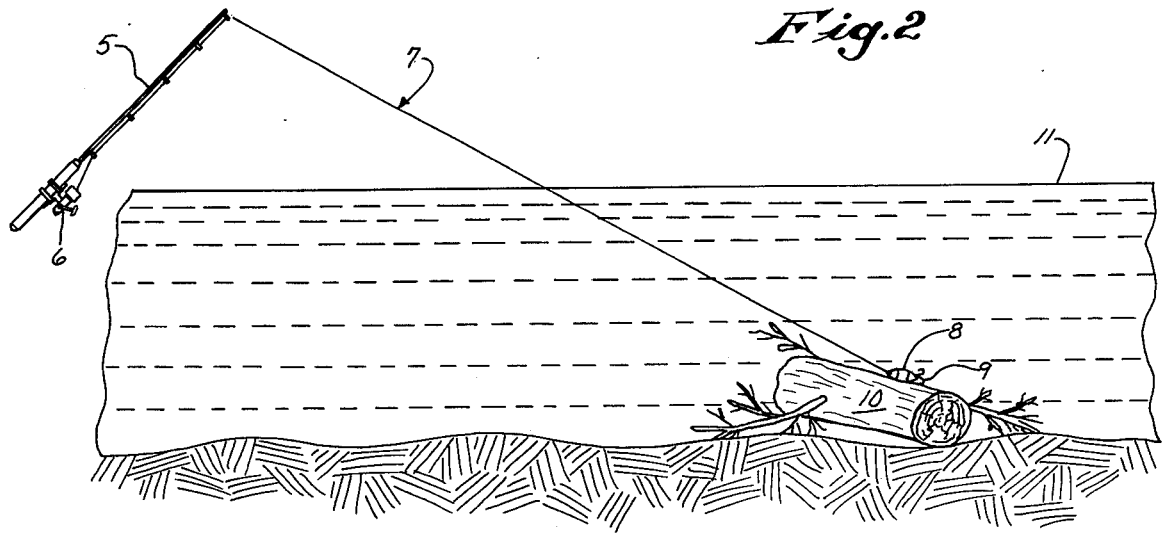
FIG. 2 is a schematic showing of a fishing rod, reel and line with the hook snagged on a log.

As shown in FIG. 2, a fisherman utilizes a fishing rod 5 having a reel 6 and a fishing line 7 with a lure 8 having at least one fish hook 9 thereon. An obstruction, such as a log 10, is disposed beneath the surface of the body of water 11. In reeling in his line, the fisherman has positioned lure 8 so that, as shown, hook 9 is snagged on the far side of log 10. Obviously, further rearward pulling on line 7 will merely imbed the reawardly facing hook 9 deeper into the log.

Figure 3:
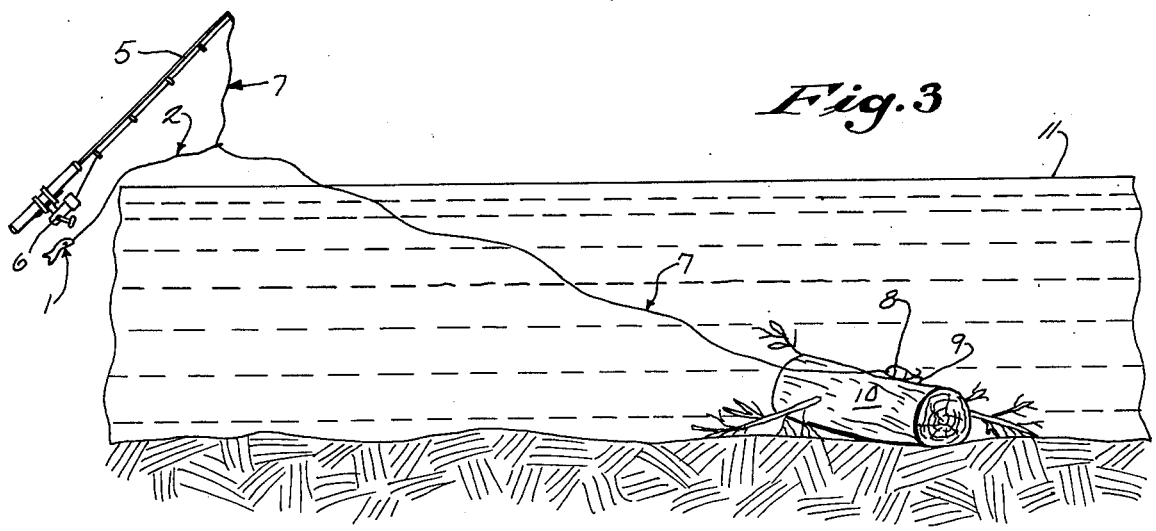
FIG. 3 is a showing similar to FIG. 2 showing the fishing line extended and the retriever affixed thereto.

As shown in FIG. 3, the length of fishing line 7 is effectively increased by then playing it out from reel 6 to provide relaxation or slack, and the reel may then be locked. Stringer 2 is then attached to line 7 via connector 4 at a position relatively closely adjacent the tip of rod 5.

As shown in FIG. 4, the fisherman then firmly holds stringer 2 in his hand and twirls it until substantial momentun of the weight has developed. Upon aiming and releasing the twirling stringer, weight 1 will be propelled or hurled forwardly. The momentum created must be sufficient to carry the weight generally horizontally through the air so that it does not drop and enter water 11 until it is on the far side of hook 9. Stringer 2 will follow along because connector 4 will slide along line 7.

The strength of stringer 2 must be sufficient to withstand the centrifugal forces which are at least several times the normal weight of weight 1 during twirling. Furthermore, stringer 2 need only be about 3 feet in length, or just sufficient to comfortably accommodate the twirling action without interfering with the fishing line.

Once weight 1 enters the water, it will drop downwardly on the far side of hook 9, effectively creating a short lower line segement 12 extending from lure 8 rearwardly to the weight stringer, and a much longer upper line segment 13 extending from the weight stringer rearwardly and upwardly out of the water to rod 5.

If the obstruction is substantially above the bed of the body of water, weight 1 will drop to below lure 8. If the obstruction is resting on the bottom 14, as shown in phantom in FIG. 4, weight 1 may come to rest on the bottom itself.

To finally retrieve hook 9, and as shown in FIG. 5, the slack in fishing line 7 is removed. The tip of rod 5 should then be positioned as low as possible, such as at hip level or even below. A sharp rearward yank or pull on rod 5 will cause strong moments of force, as shown by the arrows, on the fishing line segments. Thus, the forces on upper segment 13 will be primarily rearward. On the other hand, because of the weight connection 5 and substantial doubling up of the line, the forces on lower segment 12 will be primarily forward in a direction from hook 9 toward weight 1. This will dislodge the hook from log 10.

The concept of the invention does not require a sophisticated weight which must engage the hook to dislodge it. Nor does it depend upon water currents, which may actually be non-existant or flowing in the wrong direction. The device utilized, while simple in construction, has been found to be very effective in accomplishing the desired purpose when used as described, even when the snagged hook is at a substantial horizontal distance from rod 5.

Various modes of carrying out the invention are contemplated as being within the scope of the following claims particularly pointing out and distinctly claiming the subject matter which is regarded as the invention.

I claim:

1. A method of releasing a fishing hook snagged underwater to the far side of a submerged log or the like and where the hook is connected to relaxed fishing line, said method comprising:
   a. providing a heavy weight attached at one end to a stringer,
   b. attaching the other end of said stringer to the fishing line so that the stringer is slideable therealong,
   c. twirling said stringer to provide substantial centrifugal forces to said weight,
   d. aiming said weight and releasing said stringer so that the momentum of the weight carries the latter generally horizontally through the air to the far side of said log where the weight drops downwardly into the water, and wherein said stringer follows said weight along the relaxed fishing line,
   e. removing slack in said fishing line,
   f. and yanking said fishing line rearwardly to cause said hook to releasably move in the opposite direction and toward said weight.

2. The method of claim 1 wherein:
   a. downward dropping of said weight into the water forms said fishing line into generally doubled up upper and lower segments, with said upper segment extending rearwardly and upwardly out of the water from said stringer end with said lower segment extending rearwardly between said stringer and said hook,
   b. and said yanking step causes rearward forces on said upper segment and forward hook-releasing forces on said lower segment.

3. The method of claim 2 which includes the step of effectively lengthening the fishing line prior to twirling said stringer.

* * * * *